(12) United States Patent
Wang

(10) Patent No.: US 8,268,132 B2
(45) Date of Patent: *Sep. 18, 2012

(54) DISTILLATION-TYPE DRINKING FOUNTAIN

(76) Inventor: Long-Ming Wang, Kaohsiung (TW)

( * ) Notice: Subject to any disclaimer, the term of this patent is extended or adjusted under 35 U.S.C. 154(b) by 23 days.

This patent is subject to a terminal disclaimer.

(21) Appl. No.: 12/814,999

(22) Filed: Jun. 14, 2010

(65) Prior Publication Data

US 2011/0303759 A1    Dec. 15, 2011

(51) Int. Cl.
*B01D 3/02* (2006.01)
*C02F 1/04* (2006.01)
*E03B 9/20* (2006.01)

(52) U.S. Cl. ............... 202/167; 202/181; 202/185.3; 202/202; 203/10; 203/21; 203/100; 203/DIG. 8; 239/24

(58) Field of Classification Search ................ 202/167, 202/181, 185.3, 202; 203/10, 21, 100, DIG. 8; 239/24
See application file for complete search history.

(56) References Cited

U.S. PATENT DOCUMENTS

| | | | | |
|---|---|---|---|---|
| 35,283 A * | 5/1862 | Wing | | 68/265 |
| 1,964,708 A * | 6/1934 | Skow et al. | | 202/173 |
| 2,803,590 A * | 8/1957 | Skow | | 202/232 |
| 3,029,068 A * | 4/1962 | Skow | | 165/141 |
| 3,055,810 A * | 9/1962 | Skow | | 203/2 |
| 4,953,694 A * | 9/1990 | Hayashi et al. | | 202/180 |
| 5,200,039 A * | 4/1993 | Weber et al. | | 202/197 |
| 5,281,309 A * | 1/1994 | Greene | | 202/181 |
| 5,286,351 A * | 2/1994 | Salmon | | 203/1 |
| 5,290,402 A | 3/1994 | Tsai | | |
| 5,304,286 A * | 4/1994 | Palmer | | 202/167 |
| 5,314,586 A * | 5/1994 | Chen | | 202/177 |
| 5,662,779 A * | 9/1997 | Greene et al. | | 203/10 |
| 5,705,036 A * | 1/1998 | Wu et al. | | 202/176 |
| 5,997,738 A | 12/1999 | Lin | | |
| 6,402,897 B1 * | 6/2002 | Gunn | | 203/10 |
| 6,582,563 B1 * | 6/2003 | Adam et al. | | 203/10 |
| 6,623,694 B1 | 9/2003 | Ferguson et al. | | |
| 6,830,661 B1 * | 12/2004 | Land | | 203/10 |
| 2006/0005712 A1 * | 1/2006 | Greenwald et al. | | 99/275 |
| 2008/0277261 A1 * | 11/2008 | Paxton | | 202/180 |
| 2010/0065414 A1 * | 3/2010 | Rautenbach et al. | | 202/167 |
| 2010/0101929 A1 * | 4/2010 | Kamen et al. | | 202/185.3 |
| 2011/0147194 A1 * | 6/2011 | Kamen et al. | | 202/185.1 |

* cited by examiner

*Primary Examiner* — Virginia Manoharan
(74) *Attorney, Agent, or Firm* — Muncy, Geissler, Olds & Lowe, PLLC

(57) ABSTRACT

A distillation drinking fountain includes a liquid providing unit having a liquid entry; a heat-exchanging tube having liquid incoming and liquid outgoing ends and a heat-exchanging room, wherein the liquid providing unit connects to the liquid incoming end and communicates with the heat-exchanging room; a hot water tank having a body and a heating unit, wherein the body has a heating room connecting to the liquid outgoing end and communicating with the heat-exchanging room; a steam pipe having first and second ends, wherein the first end communicates with the heating room, and a part of the steam pipe is received in the heat-exchanging room; a condensing unit having a condenser tube, wherein the condenser tube has one end communicating with the second end; a water-collecting unit having a water-storing room connecting to another end of the condenser tube; and an outlet valve communicating with the water-storing room.

15 Claims, 5 Drawing Sheets

DISTILLATION-TYPE DRINKING FOUNTAIN

BACKGROUND OF THE INVENTION

1. Field of the Invention

The present invention generally relates to a distillation drinking fountain and, more particularly, to an energy-saving distillation drinking fountain.

2. Description of the Related Art

In general, drinking fountains are categorized into distillation type and boiling type. The term "distillation" means to heat a liquid up to a boiling point thereof. Since the liquid contains different substances having different boiling points, the substance with lowest boiling point will steam firstly after the boiling point of the liquid is reached. By this time, the steamed substance will be collected in a container and other substances with higher boiling points will remain in where they are. Thus, purification of the liquid is achieved.

A conventional distillation drinking fountain includes a heating container, a condenser tube and a water-collecting container. The heating container has a sleeve cavity and a heating unit. The sleeve cavity has a receiving space for receiving a liquid. The heating unit is disposed in the receiving space for heating the liquid contained in the receiving space. The condenser tube has one end communicating with the receiving space via a pipe, as well as another end communicating with a storage space of the water-collecting container via a pipe.

When the liquid in the distillation drinking fountain is to be distilled, the liquid is firstly poured into the receiving space of the sleeve cavity. Then, the liquid is heated up by the heating unit until a predetermined temperature is reached. The predetermined temperature is preferably a little bit higher than the boiling point of water, namely, 100° C., enabling a moisture content of the liquid to be vaporized as steam. Then, the steam enters the condenser tube via the pipe. As the steam contacts the condenser tube, the steam will condense into water molecules because the temperature of the condenser tube is lower than that of the steam. The condensed water is then directed to and collected in the storage space of the water-collecting container via another pipe. Thus, distill water is obtained for drinking purpose.

The conventional distillation drinking fountain directly heats up the liquid in the receiving space via the heating unit. However, the liquid prior to heating is in a room temperature which is very much lower than the boiling point of the liquid. Thus, more energy is required for the heating unit to heat up the liquid, resulting in a great use of energy. Therefore, it is desired to improve the conventional distillation drinking fountain.

SUMMARY OF THE INVENTION

It is therefore the primary objective of this invention to provide a distillation drinking fountain which is able to recycle the steam obtained during the distillation process for heating up a liquid, thus achieving energy saving.

It is another objective of the invention to provide a distillation drinking fountain which keeps the water level in a container within a reasonable range. Thus, a liquid contained in a hot water tank is prevented from spilling out of the hot water tank and the hot water tank is prevented from being heated up without any liquid contained therein.

The invention discloses a distillation drinking fountain comprising a liquid providing unit, a heat-exchanging tube, a hot water tank, a steam pipe, a condensing unit, a water-collecting unit and an outlet valve. The liquid providing unit has a liquid entry. The heat-exchanging tube has a liquid incoming end, a liquid outgoing end and a heat-exchanging room. The liquid providing unit is connected to the liquid incoming end and communicates with the heat-exchanging room. The hot water tank has a body and a heating unit, wherein the body has a heating room connecting to the liquid outgoing end via at least one pipe and communicating with the heat-exchanging room. The steam pipe has a first end and a second end, wherein the first end communicates with the heating room. A part of the steam pipe is received in the heat-exchanging room. The condensing unit has a condenser tube, wherein the condenser tube has one end communicating with the second end of the steam pipe. The water-collecting unit has a water-storing room connecting to another end of the condenser tube. The outlet valve communicates with the water-storing room via an outlet pipe.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
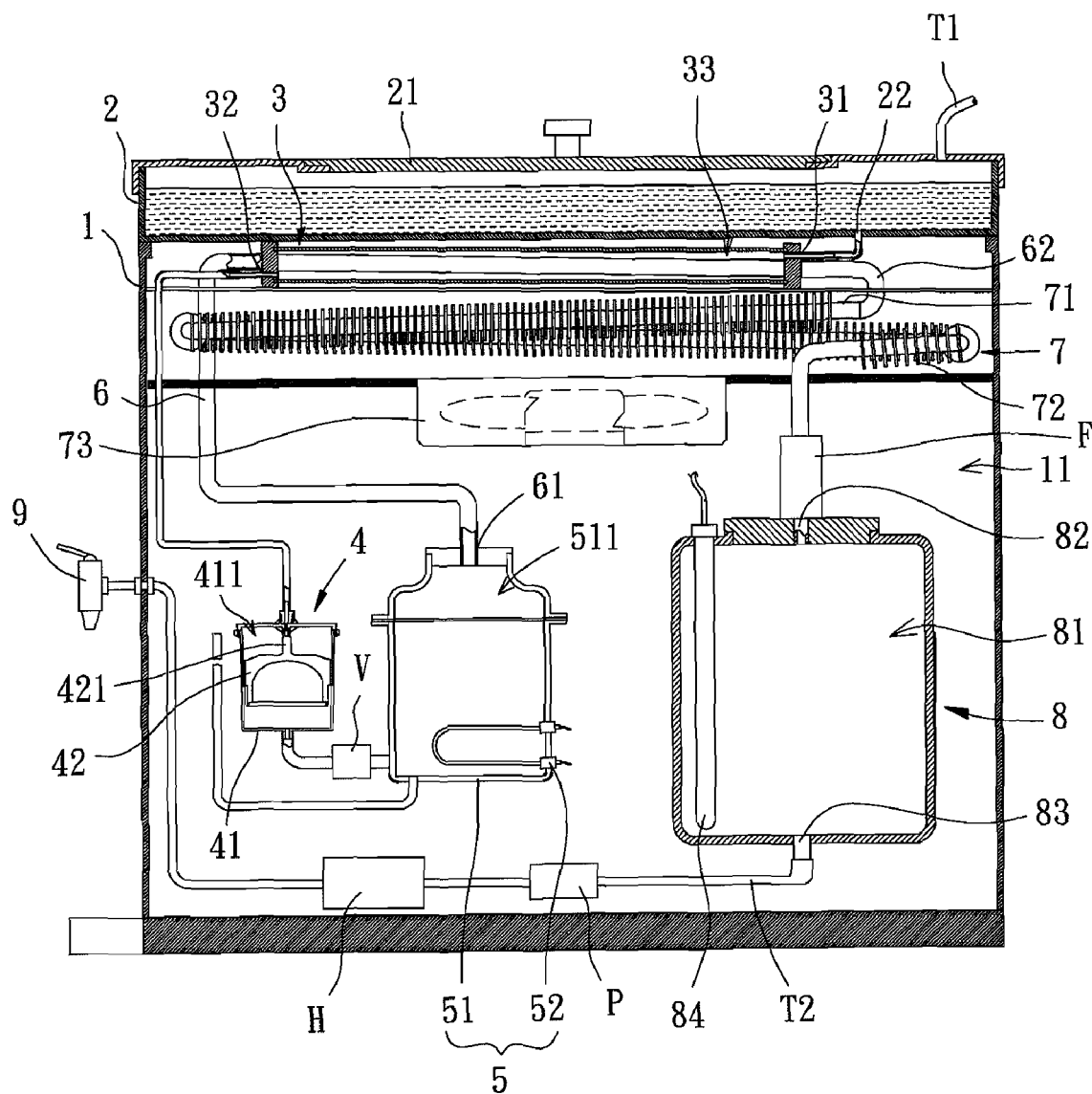
FIG. 1 shows a side cross sectional view of a distillation drinking fountain according to a preferred embodiment of the invention.

In the various figures of the drawings, the same numerals designate the same or similar parts. Furthermore, when the term "first", "second", "third", "fourth", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Referring to FIG. 1, a distillation drinking fountain comprising a housing 1, a liquid providing unit 2, a heat-exchanging tube 3, a liquid level control unit 4, a hot water tank 5, a steam pipe 6, a condensing unit 7, a water-collecting unit 8 and an outlet valve 9 is disclosed according to a preferred embodiment of the invention. The housing 1 has a cavity 11. The liquid providing unit 2, heat-exchanging tube 3, liquid level control unit 4, hot water tank 5, steam pipe 6, condensing unit 7 and water-collecting unit 8 are received in the cavity 11 and communicate with each other via pipes. The outlet valve 9 is disposed at an outer circumferential wall of the housing 1 and communicates with the water-collecting unit 8 via a pipe. Thus, distilled water is provided via the housing 1.

The liquid providing unit 2 is now regarded as a cool water tank for purpose of illustration. The liquid providing unit 2 may store a liquid to be distilled. The liquid may be poured into the liquid providing unit 2 via a cover plate 21, or may be injected into the liquid providing unit 2 via a water pipe T1. The liquid providing unit 2 has a liquid entry 22 preferably located on the bottom of the liquid providing unit 2. In this way, the liquid may flow into the heat-exchanging tube 3.

Figure 2:
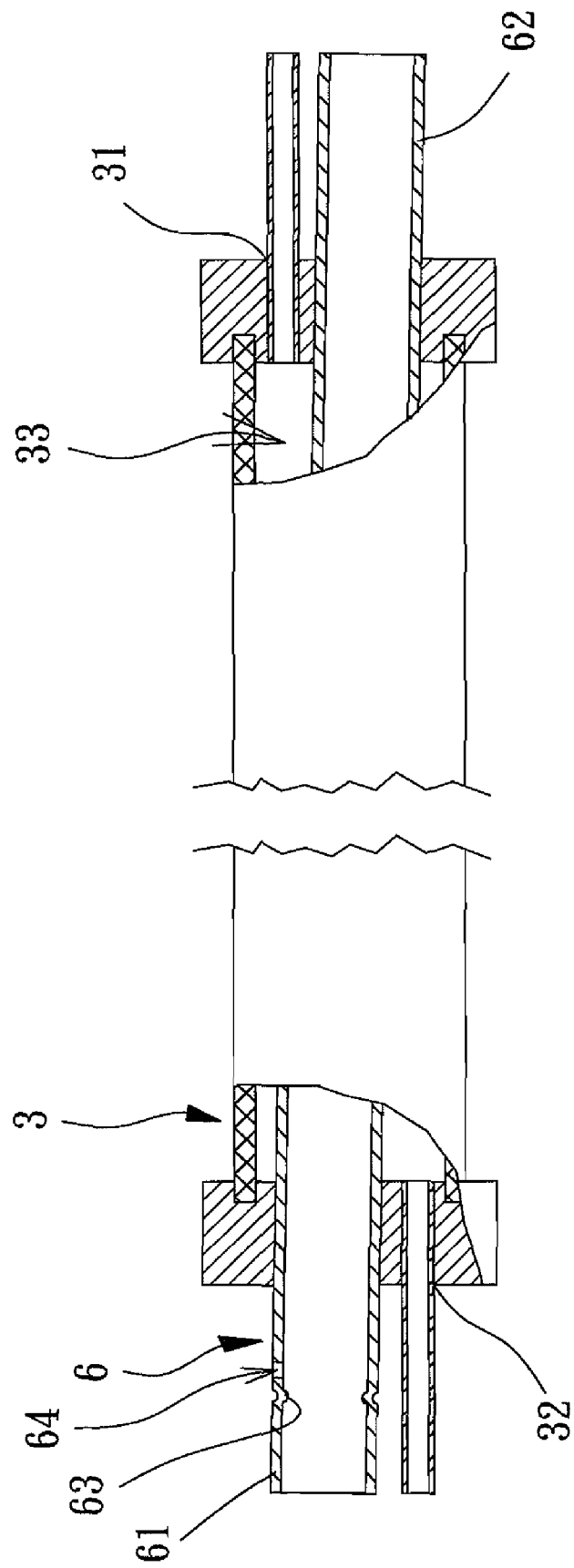
FIG. 2 shows a local side cross sectional view of a heat-exchanging tube according to the preferred embodiment of the invention.

Referring to FIGS. 1 and 2, the heat-exchanging tube 3 has a liquid incoming end 31 and a liquid outgoing end 32 on two ends thereof. The liquid incoming end 31 communicates with the liquid entry 22 of the liquid providing unit 2 via a pipe.

The liquid outgoing end 32 communicates with the liquid level control unit 4 via another pipe. The heat-exchanging tube 3 has a heat-exchanging room 33 capable of receiving the liquid and the steam pipe 6.

Figure 3:
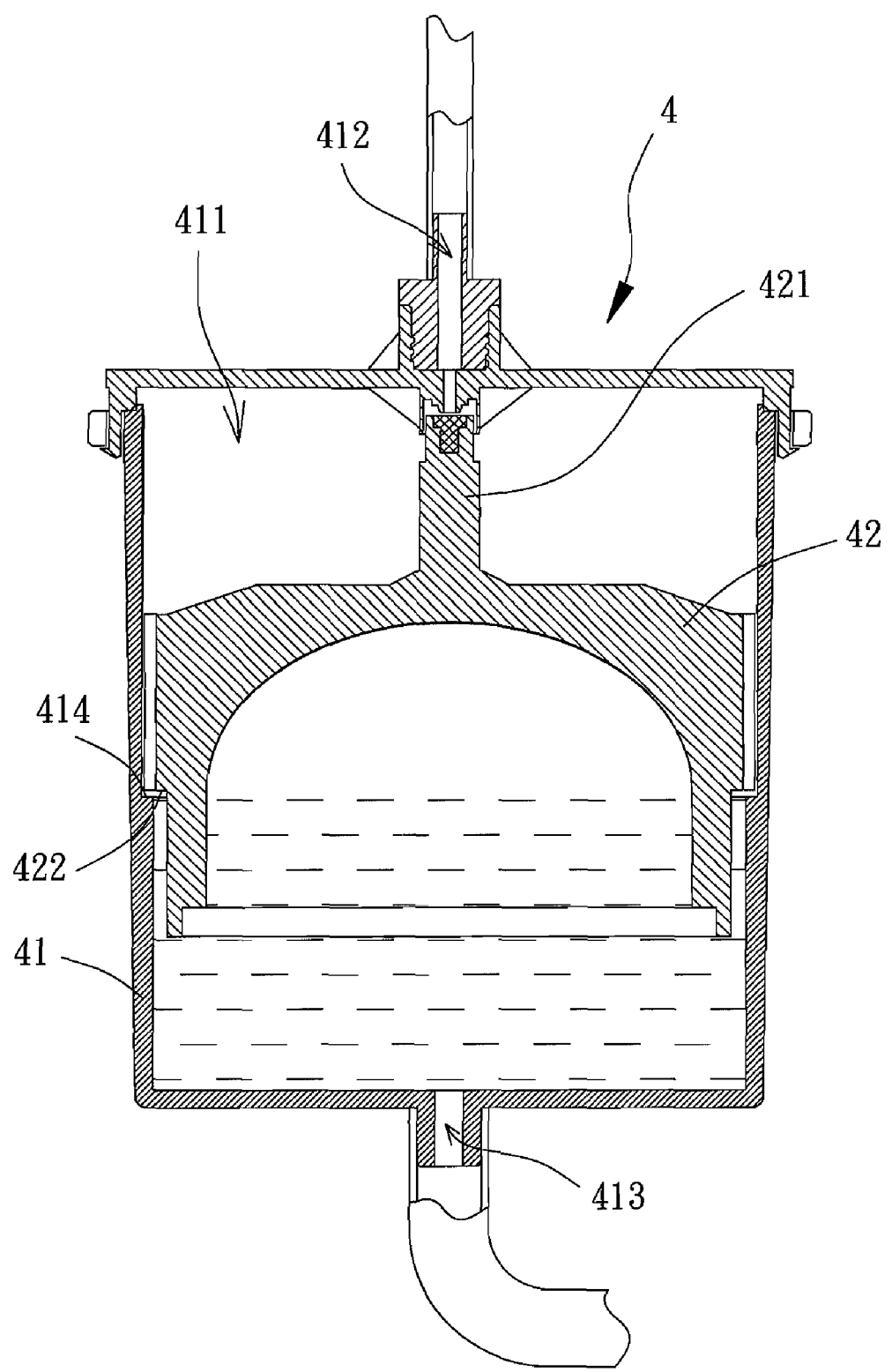
FIG. 3 shows a side cross sectional view of a liquid level control unit according to the preferred embodiment of the invention.

Referring to FIGS. 1 and 3, the liquid level control unit 4 is located between the heat-exchanging tube 3 and the hot water tank 5 and comprises a trough body 41 and a restrain member 42. The trough body 41 has a compartment 411, a water inlet 412, a water outlet 413 and a first abutting portion 414. The compartment 411 is formed in the trough body 41 and communicates with the water inlet 412 and water outlet 413. The water inlet 412 is preferably located on the top of the trough body 41 and communicates with the liquid outgoing end 32 of the heat-exchanging tube 3 via a pipe. The water outlet 413 is preferably located on the bottom of the trough body 41 and communicates with the hot water tank 5 via another pipe. The first abutting portion 414 is located on an inner wall of the trough body 41 and the restrain member 42 is located in the compartment 411. The density of the restrain member 42 must be smaller than that of the liquid to allow the elevating and descending of the restrain member 42 according to the liquid level of the liquid. The restrain member 42 has a blocking portion 421 on a top thereof. The blocking portion 421 is aligned with the water inlet 412 and may block the water inlet 412 as the restrain member 42 elevates or descends. The restrain member 42 has a second abutting portion 422 on an outer surface thereof. The second abutting portion 422 is aligned with the first abutting portion 414. The restrain member 42 may abut with the first abutting portion 414 in order to prevent the bottom of the restrain member 42 from blocking the water outlet 413. In addition, the pipe communicating the water outlet 413 with the hot water tank 5 preferably has an anti-backflow member V which prevents the liquid in the hot water tank 5 from flowing back to the compartment 411.

The hot water tank 5 has a body 51 and a heating unit 52. The body 51 has a heating room 511 therein which communicates with the compartment 411 via a pipe. The heating room 511 is used to store the liquid from the liquid level control unit 4. The heating unit 52 is prepared for the body 51 and preferably disposed in the body 51 to directly heat up the liquid in the heating room 511. The heating unit 52 may be an electrothermal tube or a thermal chip.

Figure 4:
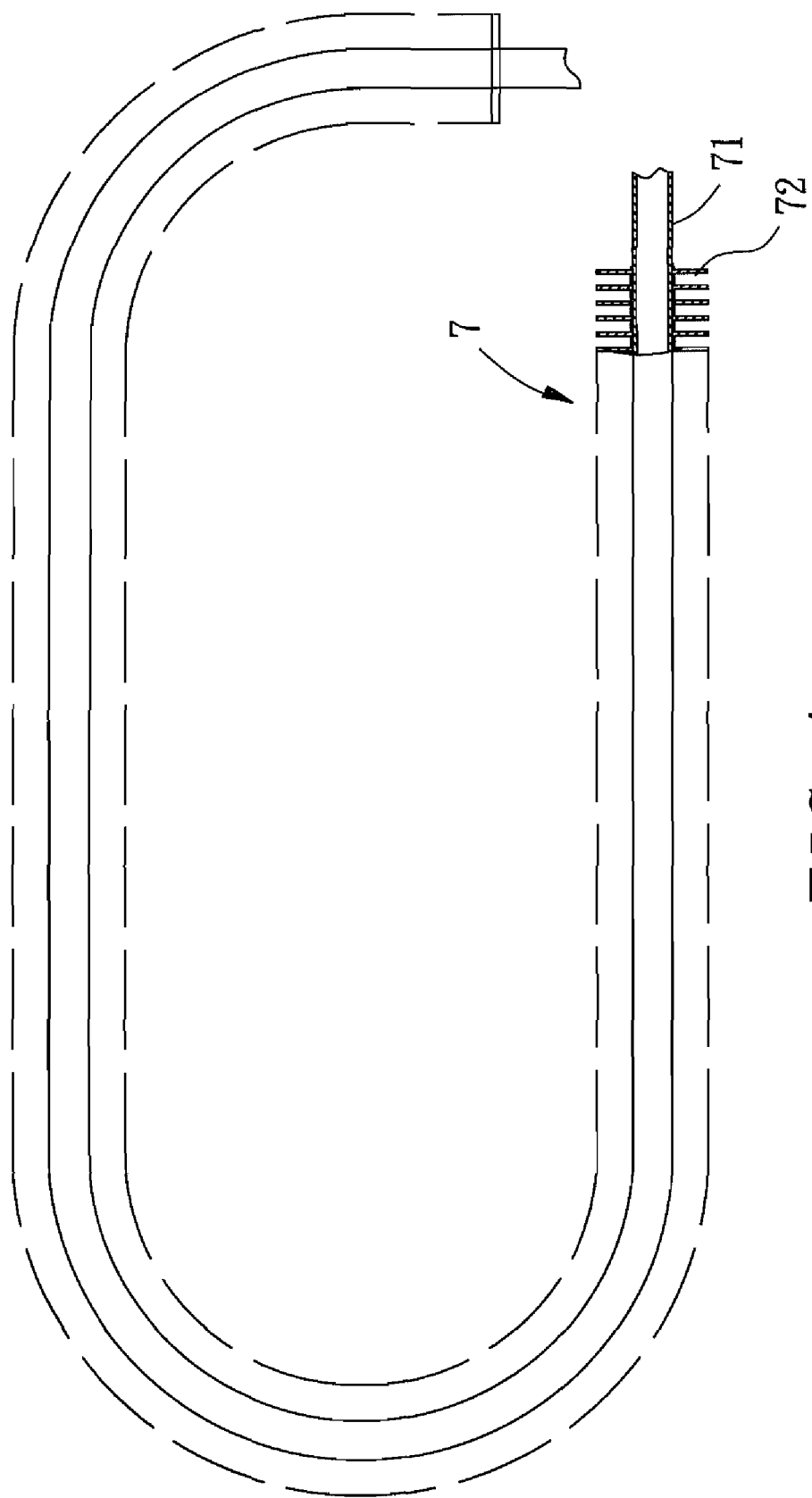
FIG. 4 shows a top view of a condensing unit according to the preferred embodiment of the invention.

Referring to FIGS. 1, 2 and 4, the steam pipe 6 has a first end 61 and a second end 62. The first end 61 extends through the body 51 to communicate with the heating room 511. The second end 62 extends through the heat-exchanging tube 3 and communicates with the condensing unit 7, enabling a part of the steam pipe 6 to be received in the heat-exchanging room 33 on purpose. The part of the steam pipe 6 received in the heat-exchanging room 33 is called a preheating portion hereinafter. The preheating portion of the steam pipe 6 appears to gently slope from the liquid outgoing end 32 towards the liquid incoming end 31. The steam pipe 6 further has a shrinking portion 63 and an exhaust hole 64. The shrinking portion 63 is located on an inner wall of the steam pipe 6 and adjacent to the liquid outgoing end 32 of the heat-exchanging tube 3. The exhaust hole 64 extends through a surface of the steam pipe 6 and is located on one side of the shrinking portion 63. In this way, the steam passing through the steam pipe 6 may be exhausted through the shrinking portion 63 and exhaust hole 64 in sequence.

Referring to FIG. 1 again, the condensing unit 7 consists of a condenser tube 71 and a plurality of cooling fins 72. The condenser tube 71 has one end communicating with the second end 62 of the steam pipe 6, as well as another end communicating with the water-collecting unit 8. The condenser tube 71 is in a labyrinth form and disposed in the cavity 11 of the housing 1. The condenser tube 71 gently extends downwards from one end communicating with the steam pipe 6 towards another end communicating with the water-collecting unit 8. The cooling fins 72 are placed on an outer circumferential face of the condenser tube 71 with even distance so that the condenser tube 71 may have larger areas contacting the cooling fins 72 for heat dissipation. The condensing unit 7 further comprises a cooling device 73 implemented as a fan in the embodiment. The cooling device 73 is located on one side of the condenser tube 71 and keeps providing air flows to the condenser tube 71 for cooling purposes.

Referring to FIG. 1 again, the water-collecting unit 8 comprises a water-storing room 81, a liquid inlet 82 and a liquid outlet 83. The water-storing room 81 is formed in the water-collecting unit 8 for storing the distilled water from the condensing unit 7. The liquid inlet 82 and liquid outlet 83 are respectively located on the top and bottom of the water-collecting unit 8 and communicate with the water-storing room 81. The liquid inlet 82 communicates with an end of the condenser tube 71 and the liquid outlet 83 communicates with the outlet valve 9 via an outlet pipe T2. In addition, the water-collecting unit 8 further comprises a sterilization unit 84 located in the water-storing room 81. The sterilization unit 84 is preferably an ultraviolet tube for sterilizing the distilled liquid in the water-storing room 81. Moreover, a pump P and a heating assembly H may be disposed on the outlet pipe T2. The pump P is electrically connected to the outlet valve 9. The heating assembly H is located between the outlet valve 9 and the pump P.

Figure 5:
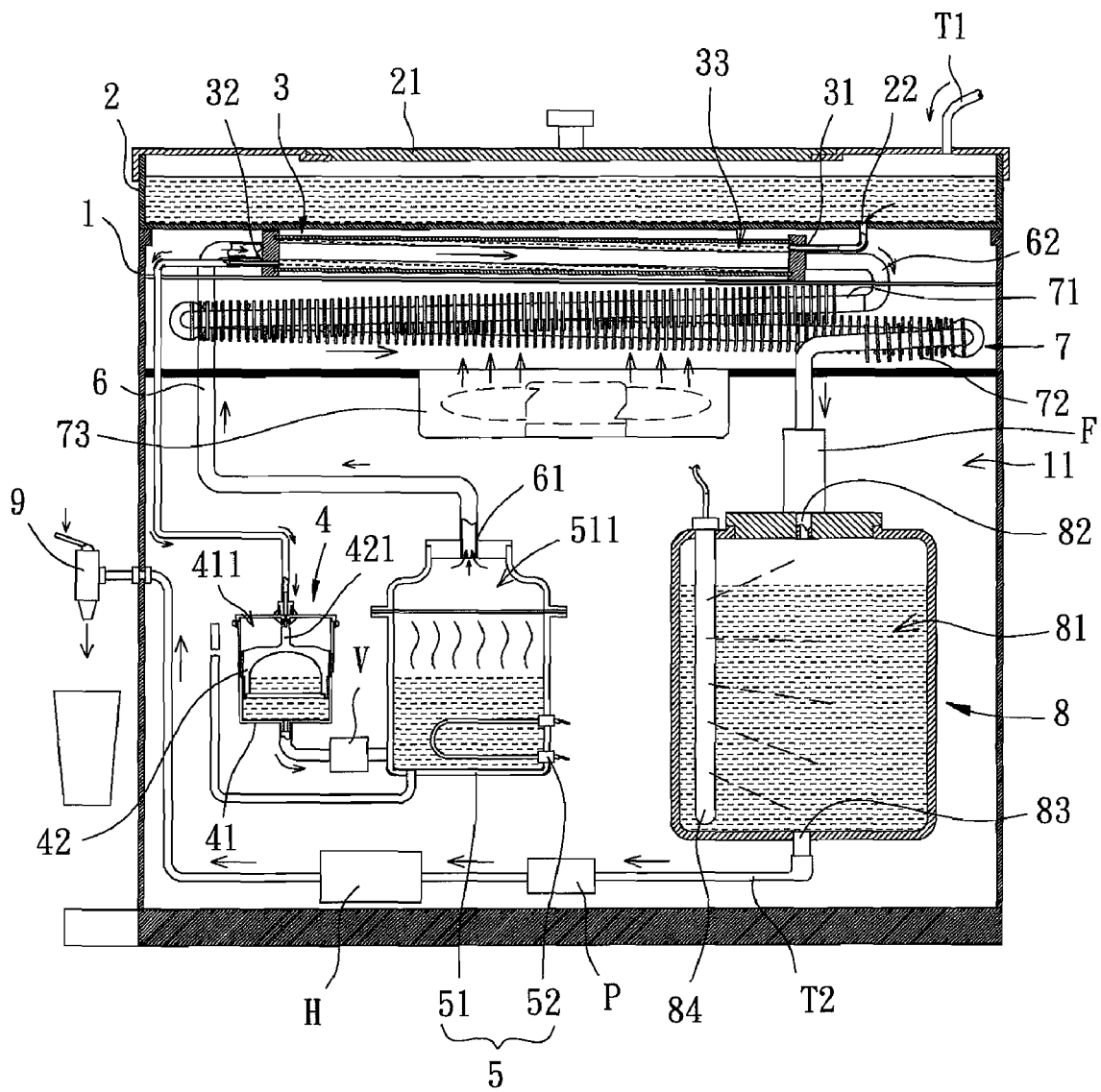
FIG. 5 shows a use of the distillation drinking fountain according to the preferred embodiment of the invention.

Referring to FIG. 5, when the liquid in the liquid providing unit 2 is to be distilled, the liquid enters the heat-exchanging room 33 of the heat-exchanging tube 3 via the liquid entry 22. The liquid in the heat-exchanging room 33 may flow out of the heat-exchanging room 33 via the liquid outgoing end 32. The liquid in the heat-exchanging room 33 may enter the hot water tank 5 via a pipe and the liquid level control unit 4. The heating unit 52 heats the liquid in the heating room 511 until the boiling point of the liquid is reached, making the moisture content of the liquid become steam. The steam then enters the steam pipe 6 and passes through the steam pipe 6 from the first end 61 to the second end 62. When the steam passes through the preheating portion of the steam pipe 6, the steam may have a heat exchange with the liquid in the heat-exchanging room 33 via the wall of the steam pipe 6. In this way, the steam in the preheating portion of the steam pipe 6 may be cooled down and also condensed, which in turn leads to a temperature increment of the liquid in the heat-exchanging room 33. Based on this, a portion of steam in the preheating portion of the steam pipe 6 is condensed into water, resulting in an existence of both steam and water in the preheating portion of the steam pipe 6.

Since the preheating portion of the steam pipe 6 slopes from the liquid outgoing end 32 towards the liquid incoming end 31, the steam along with the water in the preheating portion of the steam pipe 6 may be directed into the condenser tube 71 via the second end 62 of the steam pipe 6 along the sloping steam pipe 6. Following, the steam and water that enter the condenser tube 71 flow towards the water-collecting unit 8 along the sloping condenser tube 71. In the same time, the steam and water have a constant heat exchange with the sloping condenser tube 71 so that the steam is cooled down and finally becomes water. In the last stage, the water is directed to and stored in the water-storing room 81 of the water-collecting unit 8.

When a user is intended to obtain the distilled water in the water-collecting unit 8, a control signal is issued from the outlet valve 9 to the pump P which, upon receipt of the control signal, delivers the distilled water to the outlet valve 9 for the user. Alternatively, if the user would like to reheat the distilled water, the heating assembly H may be activated to heat up the distilled water before the distilled water reaches the outlet valve 9.

The invention preheats the liquid passing through the heat-exchanging tube 3 by the recycled steam in the steam pipe 6 and simultaneously lowers the temperature of the steam in the steam pipe 6. Thus, the temperature of the liquid entering the hot water tank 5 is increased so that the temperature difference between the liquid entering the hot water tank 5 and the boiling point of the liquid entering the hot water tank 5 is reduced. Therefore, the heating unit 52 is allowed to use less energy to boil the liquid contained in the hot water tank 5. Thus, energy saving is achieved.

Furthermore, since the liquid level control unit 4 communicates with the heating room 511, the liquid level control unit 4 and the heating room 511 will have the same water level due to the pipe connected therebetween. When the water level in the heating room 511 increases, the restrain member 42 will elevate as the water level in the liquid level control unit 4 increases. Finally, as the water level in the heating room 511 reaches a maximal level, the elevating restrain member 42 may eventually block the water inlet 412 via the blocking portion 421. As a result, the liquid is prevented from entering the heating room 511, avoiding the liquid to spill out of the hot water tank 5 via the steam pipe 6.

Moreover, based on the design of the shrinking portion 63 and the exhaust hole 64, the steam passing through the shrinking portion 63 will have larger pressure due to the narrower passageway of the shrinking portion 63. Therefore, the steam will have faster flow speed after passing through the shrinking portion 63, focusing the chlorine contained in the steam to be exhausted out of the steam pipe 6 via the exhaust hole 64. Thus, elimination of the chlorine and purification of the steam are achieved.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A distillation drinking fountain, comprising:
   a liquid providing unit having a liquid entry;
   a heat-exchanging tube having a liquid incoming end, a liquid outgoing end and a heat-exchanging room, wherein the liquid providing unit connects to the liquid incoming end and communicates with the heat-exchanging room;
   a hot water tank having a body and a heating unit, wherein the body has a heating room connecting to the liquid outgoing end via at least one pipe and communicating with the heat-exchanging room;
   a steam pipe having a first end and a second end, wherein the first end communicates with the heating room, and a part of the steam pipe is received in the heat-exchanging room, wherein the steam pipe further includes a shrinking portion and an exhaust hole, the shrinking portion is located on an inner wall of the steam pipe and adjacent to the liquid outgoing end of the heat-exchanging tube, and the exhaust hole extends through a surface of the steam pipe and is located on one side of the shrinking portion;
   a condensing unit having a condenser tube, wherein the condenser tube has one end communicating with the second end of the steam pipe;
   a water-collecting unit having a water-storing room connecting to another end of the condenser tube; and
   an outlet valve communicating with the water-storing room via an outlet pipe.

2. The distillation drinking fountain as claimed in claim 1, wherein the part of the steam pipe received in the heat-exchanging room slopes downwards from the liquid outgoing end towards the liquid incoming end of the heat-exchanging tube.

3. The distillation drinking fountain as claimed in claim 1, wherein the condenser tube extends downwards from one end communicating with the steam pipe towards another end communicating with the water-collecting unit.

4. The distillation drinking fountain as claimed in claim 1, wherein the condensing unit further comprises a plurality of cooling fins placed on an outer circumferential face of the condenser tube with even distance.

5. The distillation drinking fountain as claimed in claim 1, wherein the condensing unit further comprises a cooling device located on one side of the condenser tube for cooling purpose.

6. The distillation drinking fountain as claimed in claim 5, wherein the cooling device is a fan.

7. The distillation drinking fountain as claimed in claim 1, wherein the water-collecting unit further comprises a sterilization unit located in the water-storing room thereof.

8. The distillation drinking fountain as claimed in claim 7, wherein the sterilization unit is an ultraviolet tube.

9. The distillation drinking fountain as claimed in claim 1, wherein the outlet pipe comprises a pump and a heating assembly disposed thereon, the pump is electrically connected to the outlet valve, and the heating assembly is located between the outlet valve and the pump.

10. The distillation drinking fountain as claimed in claim 1, further comprising a liquid level control unit located between the heat-exchanging tube and the hot water tank.

11. The distillation drinking fountain as claimed in claim 10, wherein the liquid level control unit comprises a trough body and a restrain member, the trough body has a compartment storing a liquid, the restrain member is located in the compartment, and the density of the restrain member is smaller than that of the liquid.

12. The distillation drinking fountain as claimed in claim 11, wherein the trough body comprises an water inlet and an water outlet, the water inlet and the water outlet communicate with the compartment, the water inlet communicates with the liquid outgoing end of the heat-exchanging tube, and the water outlet communicates with the heating room of the hot water tank.

13. The distillation drinking fountain as claimed in claim 12, wherein the restrain member comprises a blocking portion blocking the water inlet of the trough body as the restrain member elevates or descends.

14. The distillation drinking fountain as claimed in claim 11, wherein the trough body comprises a first abutting portion located on an inner wall thereof, the restrain member comprises a second abutting portion located on an outer surface thereof, and the second abutting portion is aligned and abuts with the first abutting portion.

15. The distillation drinking fountain as claimed in claim 10, further comprising an anti-backflow member located on a pipe between the liquid level control unit and the hot water tank.

\* \* \* \* \*